Figure 1:
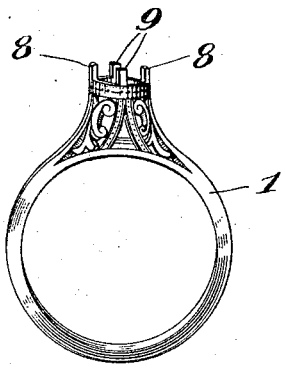

July 15, 1924.                    1,501,358

T. MOUNTFORD

METHOD OF MAKING RING MOUNTINGS

Filed July 7, 1922          2 Sheets-Sheet 1

Inventor
Thomas Mountford
Attorney

July 15, 1924.

T. MOUNTFORD 1,501,358

METHOD OF MAKING RING MOUNTINGS

Filed July 7, 1922   2 Sheets-Sheet 2

Patented July 15, 1924.                                                              1,501,358

UNITED STATES PATENT OFFICE.

THOMAS MOUNTFORD, OF NEWARK, NEW JERSEY, ASSIGNOR TO BLANCARD & CO., INC., OF NEWARK, NEW JERSEY, A CORPORATION OF NEW JERSEY.

METHOD OF MAKING RING MOUNTINGS.

Application filed July 7, 1922.   Serial No. 573,380.

*To all whom it may concern:*

Be it known that I, THOMAS MOUNTFORD, a subject of the King of Great Britain, residing at Newark, in the county of Essex and State of New Jersey, have invented certain new and useful Improvements in Methods of Making Ring Mountings, of which the following is a specification.

This invention relates to a method of making ring mountings, and this application is a continuation of an application filed by me May 3, 1922, Serial No. 558,296, for ring mountings, and wherein I have described and claimed ring mountings which may be produced by the method which is the subject matter of the present application.

Heretofore in the manufacture of ring mountings providing an extended decorative setting, usually of the perforated order, at the top, it has been customary to produce the major portion of the mounting in two separate ring-like halves which are then soldered together to form the complete shank and the two sides of the decorative setting. This soldering operation requires the abutting surfaces of the halves of this split shank to be straight and flat, but as these pieces are quite thin and are usually produced by a stamping operation, these surfaces are very often not flat and straight, with the result that the two halves must first be straightened before they can be soldered together properly. This separate straightening operation is troublesome and time-consuming. Moreover, even when the two surfaces are straight and flat, it is a very difficult and troublesome operation to solder the two halves together properly, since the two halves must be joined in exact alignment, both radial and circumferential, or the two major parts of the decorative top portion will also be out of alignment with each other and consequently the mounting will be a failure. To complete this type of mounting it is necessary to solder two small end pieces between the top portions at each end to make the setting continuous. The soldering in place of these end pieces is troublesome and time-consuming. The integral formation of the main setting portions and the shank halves prevent the shank from being used with settings of different designs or materials, and prevents removal or replacement of a setting on the shank. Even in a finished mounting of this type, a line of solder will extend around the shank where the two halves have been soldered together. The shank must, therefore, be finished, and it is difficult to obliterate the visual appearance of this line of solder. Wear will cause this line of solder to show up black and thus detract from the appearance of the mounting.

In another method often employed in manufacturing ring mountings, the shank is produced by a casting operation, which is necessarily expensive and time-consuming as compared to a stamping or punching operation, and, moreover, a cast ring shank requires machining to give the desired smoothness and finish to the surface.

It is the aim of my invention to provide a method of making a ring mounting, which method is free from all the above mentioned objectionable features, and which is inexpensive and economical to carry out. Another object of my invention is to provide a method of ring mounting manufacture requiring a minimum number of ring findings and very few operations to carry out. Another object of my invention is to provide a method of securing one or more separate ornamental side pieces of various different designs or materials to a ring shank in such a way as to permit of the easy removal of one or more of the mounted side pieces and the substitution of others of similar or of different design or material. Other objects will be in part obvious and in part pointed out hereinafter.

In accordance with my invention, I provide, by means of a stamping or punching operation, a blank of metal so designed, that when properly bent to shape it forms a complete one-piece shank with an integral frame portion at the top upon which one or more separate ornamental side pieces may be mounted, as by soldering them thereon. I then bend this blank of metal to shape and, after producing suitable ornamental side pieces, as by stamping or punching them out, or, if desired, casting and finishing them, I solder or braze the side pieces to the frame in the proper position. Preferably I extend the two ends of the shank upwardly above the frame between the ends of the side pieces to form vertical supports and also solder the side pieces to these supports. The vertical portions may be arranged to cooperate with the side pieces to hold a jewel or jewel supporting plate in place on the mounting.

Figure 2:
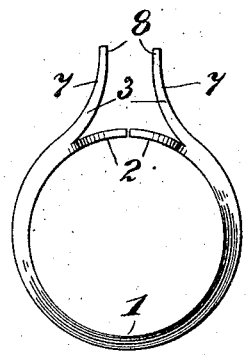
Figure 3:
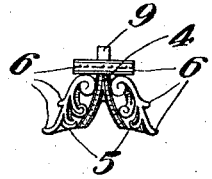
Figure 4:
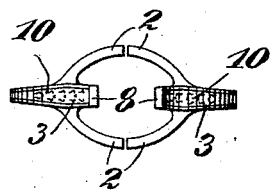
Figure 5:
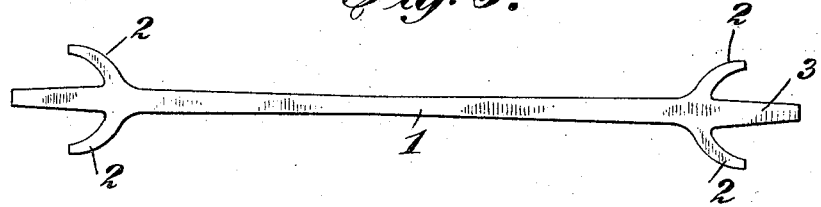
Figure 6:
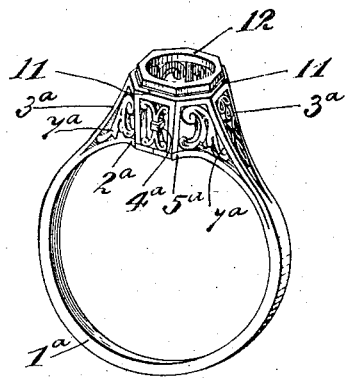
Figure 7:
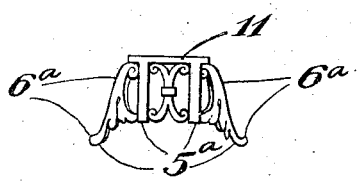
Figure 8:
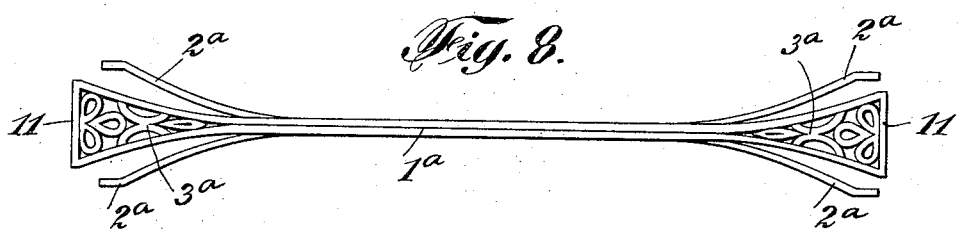

In order that a clearer understanding of my invention may be had, attention is hereby directed to the accompanying drawings forming a part of this application and illustrating certain possible embodiments of my invention. In the drawings, Fig. 1 is a perspective view of a ring mounting such as may be made in accordance with my improved method; Fig. 2 is a side elevation of the main portion of the mounting; Fig. 3 is a side elevation of one of the two separate ornamental side pieces, included in the complete mounting as shown in Fig. 1; Fig. 4 is a view of the main portion of the mounting from the top; Fig. 5 is a plan view of a blank for the main portion of the mounting, and before it is bent to shape; Fig. 6 is a perspective view of a modified form of ring mounting which also may be made by my improved method: Fig. 7 is a side elevation of one of the two separate ornamental side pieces included in the mounting shown in Fig. 6; and Fig. 8 is a plan view of a blank for the main portion of the mounting shown in Fig. 6, and before it is bent to shape. Similar reference characters refer to similar parts throughout the several views of the drawings.

Reference being had to the accompanying drawings, in carrying out my improved method of making a ring mounting I provide a blank of suitable metal, preferably by stamping or punching the same from a sheet of such metal, the stamping or punching operation being arranged to produce a blank which comprises a central portion 1 adapted to be bent to constitute a complete one piece ring shank, and also comprises one or more frame portions at one or both ends of this longitudinal central portion, which, when the blank has been bent to shape, constitutes or together constitute a supporting frame for one or more ornamental side pieces. The blank is preferably formed to have two oppositely disposed projecting portions or fingers 2 at each end of the shank portion 1, and integral therewith, and which, when the shank portion is bent to shape, are adapted to cooperate with each other to form the frame for supporting ornamental side pieces on the mounting. Frame portions 2 may be formed in the punching or stamping of the blank at an angle to the plane of the shank portion 1, so that when the shank is bent to shape, the two opposite sets of fingers 2 will automatically assume the desired cooperating position, in which the ends of one pair of fingers are closely adjacent the ends of the opposed pair of fingers. However, finger portions 2 may be formed in the stamping or punching operation in the same plane with the ring shank portion, and in this event they are subsequently bent relatively to the shank portion into the desired cooperating position, whereby they produce the frame for supporting ornamental side pieces. Preferably the adjacent ends of opposed fingers 2 are soldered together. Obviously, instead of producing the frame for the ornamental side pieces by providing the four finger portions 2 above mentioned, such frame may be as well supplied by two fingers which are adapted to bridge the space between the two ends of the shank portion when bent to shape. Such fingers may both be provided at the same end of the shank portion, so that their ends will extend to the other end of the shank portion, where they may be soldered, or one of such fingers may be provided on each end of the shank portion in complimentary positions, similarly bridging the space between the two ends of the shank in spaced apart relation, and each finger portion at its end adapted to be soldered to the other end of the shank portion. A gem setting, ornamental side pieces or similar ring findings may readily and easily be mounted upon the frame above referred to and my improved method of constructing a one piece finding which comprises both a ring shank portion and a supporting frame for other component parts or findings, renders the operation of constructing the ring mounting extremely cheap, and capable of being carried out quickly, and aids in the production of a finished ring mounting with a very few number of operations.

The ornamental side pieces 4 referred to may also be produced by stamping or punching the same from a sheet of suitable material. These ornamental side pieces may be provided in various designs, and I mount these side pieces in place on the frame provided by fingers 2 by soldering the side pieces in position thereon. Preferably the ornamental side pieces 4 are so designed that their lower edges 5 will rest upon the upper surface of the frame 2, where the soldering may be accomplished. These side pieces 4 may be provided with a suitable number of integral cramp portions 9, by means of which a jewel may be supported on the mounting in the usual manner, or the side pieces 4 may be flat along their upper edges, as at 11, and the usual jewel holding plate or ring 12 may be soldered to the portions 11 to support one or more jewels in the usual manner. It is to be noted that the ornamental side pieces 4 may readily and easily be interchanged upon the finding which comprises the one piece shank and supporting frame, since to change a side piece the mounted one may easily be unsoldered from the frame 2 and a different side piece soldered thereon. Thus the design and even the type of jewel mount may be changed easily and quickly to suit the pleasure of the purchaser, or at any time when it is desired to make a change of this kind.

As a modification of the method of construction above described, I may form the main punching so as to comprise not only the ring shank portion 1ª, Figure 8 and the frame portion, but to provide in addition an integral portion 3ª extending longitudinally from each end of the shank portion 1ª. These integral portions 3ª may be so shaped and positioned in the stamping operation that when the fitting is bent to shape, they will extend upwardly above the frame 2ª and will be suitably positioned to fit snugly between two ornamental side pieces 4ª when placed upon the frame 2ª on opposite sides of the ring. If the portions 3ª do not automatically assume their proper positions, they may be readily bent relatively to the shank portion into the position desired. In this modification the ornamental side pieces 4ª are preferably so designed that they will have side edges or points 6ª which will abut the side surfaces 7ª of the fingers 3ª when mounted in position, and I preferably solder the edges 6ª to the surfaces 7ª. If desired, the fingers 3ª may be designed to present cramp portions 8ª above the side pieces 4ª to cooperate with the cramps 9ª in holding a jewel in place on the mounting, or finger portions 3ª may have flat upper edges cooperating with the edges 11 of flat-topped ornamental side pieces to cooperate therewith to hold the jewel plate or ring member 12. Portions 3 may also be bent toward each other between fingers 2 and have their ends soldered together.

If desired, a design may be stamped directly into the outer surface of the blank 1 and finger portions 3, as at 10, Figure 4 when the blank is produced. Or, if desired, these surfaces may be left plain and a design supplied thereto at any time.

It will be noted that by means of my method a complete ring mounting requiring very few parts may be produced by a very few simple operations. The necessity of producing a split shank as formerly, and the difficult process heretofore required of soldering these two halves together, with the resultant objectionable line of solder around the shank, are avoided. The expense and disadvantages of producing the ring shank by means of a casting operation are also eliminated. In addition, by my method a ring mounting, comprising two different kinds of metal, may be easily provided. For instance, the main portion of the shank may be of one metal, such as green gold, and the side pieces 4 may be platinum. Another advantage of my method of construction is that the shank portion of the ring mounting may be associated with ornamental side pieces of any one of a number of different designs, or materials, as desired.

Prior methods required the side portions to be made integral with the shank portions, and, therefore, the use of the shank was limited to one design of setting. Moreover, it will be readily apparent that one or more of the ornamental side pieces may be readily and easily removed from the shank and new side pieces substituted in place of those removed.

As many changes could be made in the above method and many apparently widely different embodiments of this invention could be made without departing from the scope thereof, it is intended that all matter contained in the above description or shown in the accompanying drawings shall be interpreted as illustrative and not in a limiting sense.

What I claim is:—

1. The method of producing a ring mounting, which includes, providing an integral metallic blank having a shank portion and frame portions, and bending said blank to shape said shank portion into a complete one-piece ring-shank and to position said frame portions for supporting a side piece.

2. The method of producing a ring mounting, which includes, providing an integral metallic blank having a shank portion and frame portions, bending said blank to shape said shank portion into a complete one-piece ring-shank and to position said frame portions for supporting a side piece, and attaching a side piece to said positioned frame portions.

3. The method of constructing a ring mounting, which includes, providing an integral metallic blank having a shank portion and a frame portion, bending said blank to shape to form a complete one-piece ring-shank with separated ends and positioning the frame portion to bridge the space between said shank ends for supporting side pieces.

4. The method of constructing a ring mounting, which includes, providing an integral metallic blank having a shank portion and two oppositely disposed projecting portions adjacent each end of said shank portion, and shaping said blank so that said shank portion forms a complete one-piece ring-shank, and said projecting portions form a supporting frame for side pieces.

5. The method of constructing a ring mounting, which includes, providing an integral metallic blank having a longitudinal central portion and finger portions adjacent one end thereof, bending said central portion into ring-like shape, to form a complete one-piece ring-shank, and positioning the said finger portions to form a frame for supporting side pieces and disposed substantially at right angles to the plane of the bent central portion.

6. The method of constructing a ring mounting, which includes, providing an integral metallic blank having a longitudinal central portion and two pairs of finger portions extending outwardly from opposite sides of said central portion, one pair adjacent each end thereof, bending said central portion into ring-like shape, to form a complete one-piece ring-shank, positioning the said finger portions to form a frame for supporting side pieces and disposed substantially at right angles to the plane of the bent central portion, with the ends of the two finger portions which extend from adjacent one end of said central portion opposing and adjacent the ends of the two finger portions extending from adjacent the other end of said central portion, and soldering the opposed and adjacent ends of said finger portions together.

7. The method of producing a ring mounting, which includes, providing an integral metallic blank having a shank portion, transverse frame portions and portions extending longitudinally of said shank portion and beyond said transverse portions, and bending said blank to shape said shank portion into a complete one-piece ring-shank, and to position said transverse frame portions to form a horizontal frame for supporting side pieces, and to position said extending portions to form vertical supports for side pieces.

8. The method of producing a ring mounting, which includes, providing an integral metallic blank having a shank portion, transverse frame portions and portions extending longitudinally of said shank portion and beyond said transverse portions, bending said blank to shape said shank portion into a complete one-piece ring-shank, and to position said transverse frame portions to form a horizontal frame for supporting side pieces, and to position said extending portions to form vertical supports for side pieces, and attaching side pieces to said shaped blank by soldering them to said horizontal frame and to said vertical supports.

9. The method of producing a ring mounting, which includes, providing an integral metallic blank having a shank portion, transverse frame portions and portions extending londitudinally of said shank portion and beyond said transverse portions, bending said blank to shape said shank portion into a complete one-piece ring-shank, and to position said transverse frame portions to form a horizontal frame for supporting side pieces, and to position said extending portions to form vertical supports for side pieces, and attaching side pieces to said shaped blank by soldering them to said horizontal frame and to said vertical supports, the upper ends of said vertical supports being formed to constitute cramps adapted to cooperate with cramps on the upper edges of said mounted side pieces to support a jewel.

This specification signed and witnessed this 1st day of July, 1922.

THOMAS MOUNTFORD.